INVENTOR.
ROGER E. CLAPP

July 20, 1965   R. E. CLAPP   3,195,397
OPTICAL SYSTEM FOR DISPLAYING SIGNALS IN COLOR
Filed March 21, 1961   2 Sheets-Sheet 2
FIG. 4
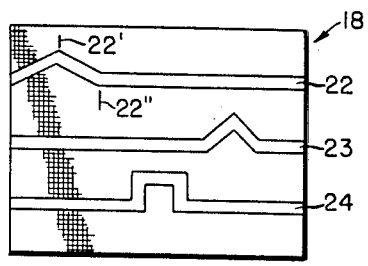
FIG. 5
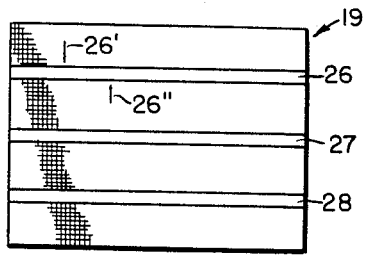
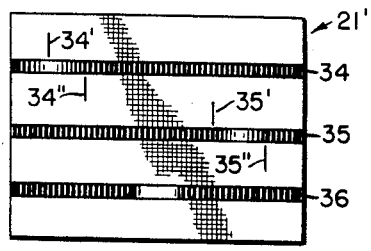
FIG. 6
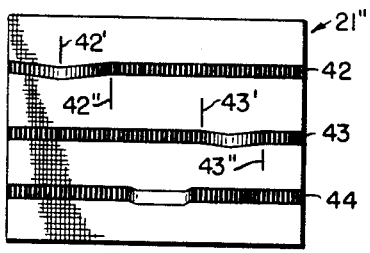
FIG. 7
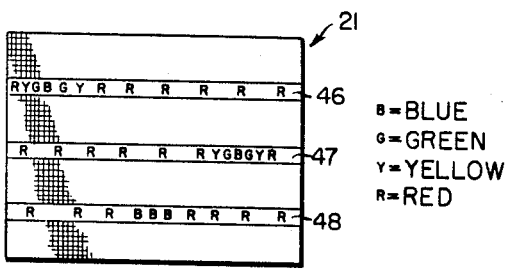
B = BLUE
G = GREEN
Y = YELLOW
R = RED
FIG. 8
INVENTOR.
ROGER E. CLAPP
BY
ATTORNEYS

United States Patent Office 3,195,397
Patented July 20, 1965

3,195,397
OPTICAL SYSTEM FOR DISPLAYING SIGNALS IN COLOR
Roger E. Clapp, Cambridge, Mass., assignor to Air Technology Corporation, Cambridge, Mass., a corporation of Delaware
Filed Mar. 21, 1961, Ser. No. 97,288
6 Claims. (Cl. 88—1)

This invention relates generally to signal display systems and more particularly it is concerned with oscilloscope displays of a two-dimensional field of scan.

In most cases where a cathode ray tube oscilloscope is used to display signals representing a field of scan, intensity modulation of the writing beam offers the most satisfactory approach to the translation of the signals into a comprehensible visual form. In the standard television display, for example, the writing beam is caused to trace a raster of lines, much as the lines of a printed page are read, while at the same time the beam is modulated in intensity in response to signals representing objects within the field. A similar display is used for radiometric mapping systems, in which the variations in the emission from an irregular target surface, such as a large land mass, appear as variations in the brightness of the traces defining the raster. The B scan, widely used in radar systems is also a raster scan in which intensity modulation of the beam is produced in response to target signals whose locations in azimuth and range correspond to the $x$ and $y$ coordinates of the display.

Although six shades of brightness are generally the maximum number that can be distinguished in an ordinary intensity modulated display, such a limited contrast range is not a disadvantage usually. For a television picture, this contrast range is sufficient. For most radar systems, even those using signal compression to reduce the range of signal intensities, six shades of brightness are still generally sufficient. However, in radiometric mapping systems of high sensitivity, and for that matter in most systems incorporating integration processes to mask random fluctuations in the signals representing a particular object or area, the number of detectable gradations in the intensities of the received signals is much greater than this. For such systems, deflection modulation of the cathode ray tube beam instead of intensity modulation affords a more precise mode of visual representation of objects in the field of scan. In deflection modulation, generally the cathode ray tube beam is deflected vertically as a function of the modulation signals while the beam is being swept back and forth in a horizontal direction to define the lines of a raster. Oscilloscopes having electrostatic deflection systems are used most often for a deflection modulated display, because of the frequency limitations of practical magnetic deflection systems. In radiometric mapping, however, a relatively low rate of scan is utilized with the result that the frequency components of the signals to be displayed are confined to a relatively low range of frequencies and are therefore easily reproducible by deflection modulation on either an electrostatic or a magnetic deflection oscilloscope. A disadvantage of this form of display is the difficulty or impossibility of determining the reference levels corresponding to the positions of the lines of the raster when they are unmodulated. Also, adjacent traces exhibiting large vertical deflections resulting from relatively strong signals are subject to overlap which obscures the character of the signals. Still another obvious disadvantage of a deflection modulated display is that it is much more difficult for an observer to interpret it as a map-like facsimile of a particular geographic area.

It is the general object of the present invention, therefore, to provide an improved signal display system for displaying signals representing a two-dimensional field of scan such that a large number of different signal intensity levels are distinguishable in the display.

A more specific object is to provide a display system of the above-mentioned character which is easy to interpret.

A further objct is to provide a system for developing a color display which is not nearly as complicated as conventional systems embodying color tubes.

In brief, the present invention contemplates the translation of an ordinary deflection modulated oscilloscope display into a line-by-line color display through the use of a record of the oscilloscope display in the form of a positive transparency. That is to say, the deflection modulated traces defined by the oscilloscope are reproduced as transparent traces on a light opaque mask. For example, if there are no signals then the traces will be straight parallel lines, but if signals of varying intensity are present then these signals will appear as lateral deflections of the lines. If the orientation of the unmodulated lines is horizontal, then the lateral deflections will be vertical. Spaced a short distance beyond this first record or mask is a second mask which is provided with light transparent traces in the form of straight lines corresponding to the traces defined by the oscilloscope in the absence of modulating signals. Both masks are disposed in the paths of divergent rays of light having distinctive colors. These light rays can be conveniently produced by means of a source of polychromatic light which is passed through a prism. The function of the masks is to transmit rays of selected color radiating in directions determined by the alignment of corresponding points on the traces of the masks which in turn are a function of the deflections of the traces representing the modulation signals on the first mask. Thus, a variation in signal intensity which was originally represented by vertical deflections from a horizontal line will now be represented by corresponding variations in color along a horizontal line. The net result is a raster of straight lines of varying color which resembles a color scene of the field of scan as viewed through a horizontal grating.

The novel features of the invention together with further objects and advantages will become apparent from the following detailed description and the drawings to which it refers. In the drawings:

FIG. 4 is a plan view of a mask incorporating signal information;

FIG. 5 is a plan view of a mask suitable for use with the mask of FIG. 4;

FIG. 6 is a plan view of a photographic reproduction obtained with the embodiment of FIG. 2;

FIG. 7 is a plan view of a photographic reproduction obtained with the embodiment of FIG. 3; and FIG. 8 is a plan view of the color display seen by eye as a virtual image, in the embodiment of FIG. 1.

Figure 1:
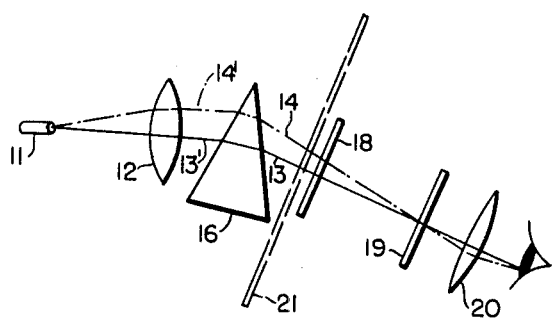
FIG. 1 is a diagrammatic illustration of the display system of the present invention, in an embodiment designed for direct visual observation of the display.
Figure 2:
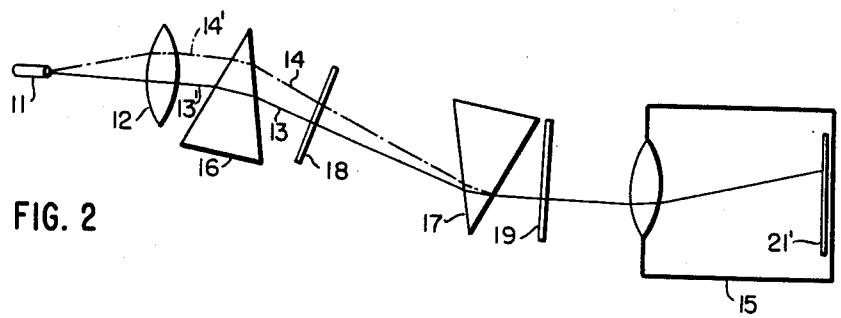
FIGS. 2 and 3 are diagrammatic illustrations of embodiments designed to provide a photographic record of the display.
Figure 3:
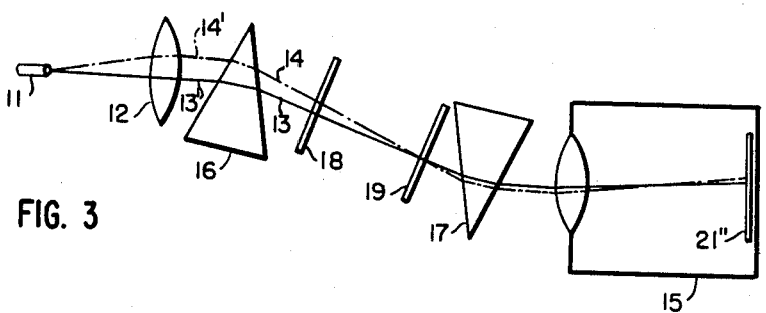

With reference generally to the embodiments of FIGS. 1, 2, and 3 it will be observed that in each of these embodiments there is provided a source of polychromatic light 11, preferably one that approximates a point source, and a collimating lens 12 to translate light from the source into parallel rays such as rays 13' and 14'. Beyond the lens 12 the rays are refracted by a wedge-shaped prism 16, made of a transparent dispersive material such as glass. The prism is so oriented that the rays of light enter the prism through one of the two broad faces forming the dihedral wedge angle and leave the prism through the other of these two broad faces. The parallel rays of white light, such as 13′ and 14′, are dispersed by the action of the prism into their spectral components and emerge from the prism travelling in a fan of angular directions. The emerging ray 13 represents a particular monochromatic component of the entering ray of white light 13′, while the emerging ray 14 is a monochromatic component of the entering ray 14′. While the rays 13′ and 14′ are parallel as they enter the prism 16, the emerging rays 13 and 14 have been chosen to have different colors, and therefore have been refracted through different angles by the prism 16 and emerge travelling in directions which are not parallel. A pair of plane masks 18 and 19 are located in the paths of the rays beyond the prism 16, the two plane masks being oriented approximately at right angles to the ray 13.

In the embodiment of FIG. 1 the light rays transmitted through the two masks 18 and 19 are viewed as they emerge from the second mask 19. An eyepiece 20, which is focused on the second mask 19, permits direct visual observation of the display, which appears as the virtual image 21 of the mask 19.

In the embodiment of FIG. 2, a second prism 17, with substantially the same dispersive properties as the prism 16, is interposed between the two masks 18 and 19, and is oriented in a position which is rotated 180° from the position of the first prism 16. The light rays of different colors, which diverge in different directions after emerging from the first prism 16, are made parallel once again in passing through the second prism 17. Beyond the second mask 19, in the embodiment of FIG. 2, a camera 15 is placed, to record the display as a photographic reproduction 21′. The camera is focused on the second mask 19. Since the light rays emerging from the second mask 19 are parallel, the camera 21 may be placed any convenient distance behind the mask 19. It should be noted that in the embodiment of FIG. 1, the light rays emerging from the mask 19 are not parallel, and the eyepiece 20 must accordingly be kept close to the mask 19, to permit all colors in the display to be seen at the same time.

In the embodiment of FIG. 3, the second prism 17 is placed beyond the second mask 19 for convenience in the mechanical positioning of the two masks 18 and 19. The light rays of different colors are again brought to parallelism by the prism 17, permitting the location of the camera 15 at any convenient distance behind the prism 17, but rays of different colors which were in vertical alignment at the mask 19 will be slightly displaced vertically from one another as a result of their divergence after leaving the mask 19 and before their passage through the prism 17. This slight vertical displacement will be carried over to the photographic reproduction 21″.

A simplified form of mask 18 is shown in FIG. 4. From FIG. 4 it will be observed that the mask carries a raster of transparent lines 22–24 which extend generally in a horizontal direction and exhibit vertical fluctuations at certain locations. More specifically FIG. 4 is intended to illustrate a photographic transparency of a deflection modulated raster scan as it appears on the face of an oscilloscope. Those skilled in the art will appreciate that an actual scan will include many more lines than three and each line will usually fluctuate in a much more irregular manner for the greater part of its length. As will appear, however, a more regular scan has been illustrated to simplify understanding of the invention.

Of a similar nature to mask 18 is the mask 19 shown in detail in FIG. 5. From FIG. 5 it will be observed that the mask 19 has three lines 26–28 which are oriented in like manner as lines 22–24 but which are undeflected as when the raster scan represented by the lines of mask 18 is unmodulated. FIG. 6 is illustrative of the photographic record 21′ which the camera 21 produces in the embodiment of FIG. 2. Although it is preferred that a color-sensitive record or film be employed, the invention contemplates the use of black and white film as well. Accordingly, FIG. 6 is intended to represent a black and white picture of the mask 19 as illuminated by the rays 13 and 14 together with the various other divergent rays of differing colors which are produced by the prism but have not been shown in the drawings.

FIG. 7 is of a similar nature to FIG. 6 and represents, in a similar way, a black and white picture of the mask 19, with the prism 17 interposed between the mask 19 and the camera 15, as in FIG. 3. The slight departure from straightness of the lines will in many practical applications be unimportant and negligible.

In the embodiment of FIG. 1, a virtual image 21 of the mask 19, is viewed directly by eye. This virtual image is depicted in FIG. 8, where the different colors have been denoted by letters, whose meaning is explained in the accompanying key. The particular coloring indicated is determined by the particular choice of spacing and relative alignment of the masks 18 and 19. If a filter is incorporated in the eyepiece 20 to exclude light in the red portion of the spectrum, only those parts of the traces in FIG. 8 which corresponded to vertical excursions in FIG. 4 will appear bright.

The operation of the invention will first be explained as it applies to the embodiment of FIG. 2. In the operation of this embodiment, light from the source 11 is collimated by the lens 12 and dispersed by the prism 16 into divergent rays of different colors. For simplicity, let it be assumed that the rays transmitted by the prism 16 have discrete angular displacements and finite cross-sectional dimensions corresponding to the thickness of the lines 22–24 and 26–28. Under these assumptions, it follows that only one ray such as the ray 14 will be permitted to pass both of the masks at point 22′ on line 22 of mask 18 and at corresponding point 26′ on line 26 of mask 19 because of the alignment of the transparent regions of the masks in the vicinity of these points. Similarly, a differently colored ray such as ray 13 will be the only one permitted to pass corresponding points 22″ and 26″ on the masks as their alignment with respect to the various divergent rays emanating from the prism 16 is not the same as that of points 22′ and 26′. The same is true of all other points on lines 22 and 26 to the right of the points 22′ and 26″ from which it follows that only rays of the same color as ray 13 are permitted to pass through lines 22 and 26 everywhere to the right of points 22″ and 26″.

By way of example, the masks 18 and 19 can be aligned so that the color passed by corresponding points 22″ and 26″ is a red color. Ray 13 will then be red. The separation of the masks 18 and 19 can then be independently adjusted until ray 14, the ray passed by corresponding points 22′ and 26′, is blue. Where the raster in FIG. 4 shows a deflection intermediate between the maximum shown (point 22′, blue color) and zero deflection (point 22″, red color), the color transmitted will have an intermediate location in the spectrum between red and blue. The distribution of the colors, blue, green, yellow and red is indicated in FIG. 8.

With a shorter distance between masks 18 and 19, the color passed by points 22′ and 26′ can be set at green rather than blue, while the color passed by points 22″ and 26″ is maintained at red. With a larger separation, the colors can be set respectively at violet and red. With a shorter distance and a change of alignment, the maximum deflection on mask 18 can be made to give a violet color and zero deflection a green color. Negative reflections, not shown in FIG. 4, would then give yellow and red. It is evident, therefore, that great flexibility and variety in the display is possible, permitting an overall examination of the full range of deflection modulation, and a close study of a particular increment of deflection. In the latter case, a small change in deflection amplitude in the vicinity of a selected amplitude level can be indicated in terms of a large color change, while other deflection levels can be placed outside the visible spectrum for the most part.

With the masks positioned to give a red color for zero deflection and a blue color for the maximum deflection, and with a blue-sensitive, red-insensitive film, the photographic record 21' will be as shown in FIG. 6. More specifically, where there is no deflection as in the right-hand part of line 22 of FIG. 4, the photographic record will be dark as shown by the right-hand part of line 34 of FIG. 6. Where there is upward deflection, as at point 22' of FIG. 4, the transmitted color will lie in the spectral region to which the film is sensitive, and there will be a bright region on the photographic reproduction, as at point 34' in FIG. 6. If the film response rises steadily as the color blue is approached, then the point 34' will be the brightest point in line 34, corresponding to the maximum deflection at the point 22' along the line 22. In line 35, the region between points 35' and 35" is the only bright part, and this increases and decreases in brightness somewhat more abruptly than the section toward the left of point 34" on the line 34. As is apparent, this is because of the more abrupt deflection of line 23, as compared with that of the line 22. In the central region of line 36 there is a substantially instantaneous change from dark to light and thereafter from light to dark representing the squared-pulse form of the line 24 in this region.

FIG. 7 is illustrative of the photographic reproduction 21" that would be obtained for substantially the same alignment and spacing of the masks 18, and 19, but with the second prism placed between the mask 19 and the camera 15 in accordance with the embodiment of FIG. 3. As shown, FIG. 7 resembles FIG. 6 very closely except for the lack of straightness of the lines 42–44. In particular, lines 42–44 exhibit small vertical deflections corresponding to the deflections of lines 22–24 in FIG. 4 but in the opposite direction. These small deflections are the result of the small divergence of the light rays in the region between the second mask 19 and the second prism 17. This effect can be eliminated if the raster lines in the mask 19 are deflected in a proportionate but less pronounced manner than those of the mask 18. This will compensate in advance for the divergence of the light rays in the region between the mask 19 and the prism 17. Also a third mask, comprising straight lines as in FIG. 5, can be added beyond the second prism 17, which will aid in sharpening the record 21", particularly if large deflections are present which cause overlapping of adjacent lines on mask 18.

In the practical case where many more than three lines are used to form a raster, then the spacing of the lines will be much closer than has been illustrated in the drawings. It folows that in this case the record provided by the camera or the virtual image viewed by eye, will resemble an actual picture of a geographical area. In the case of the camera record, the detail of the picture will be enhanced appreciably if a color film is used instead of a black and white film.

Various modifications that are within the spirit and scope of the invention will no doubt occur to those skilled in the art. The use of three masks instead of two has already been mentioned. The adjustment of the alignment and spacing of the masks, to control the functional relationship between oscilloscope beam deflection and display color has also been mentioned. In addition, color filters can be used to single out for study or recording those portions of the display field which are of particular interest. In this way, contours of equal deflection can be traced over the field of view. The requirement for a collimated light source can also be relaxed or removed, provided that appropriate modifications are made in the masks. For example, in FIGS. 1, 2, and 3, the combination of light source 11 and collimating lens 12 can be replaced by a more distant light source without a lens, provided that the light source is very nearly a point source. The rays entering the prism 16 will then be slightly divergent instead of truly parallel. To maintain the proper alignment of the two masks 18 and 19, the raster lines on the second mask 19 can be set slightly farther apart, or the lines on mask 18 can be set slightly closer together, to correspond to the slight divergence of all rays that will take place over the space between the two masks, independently of the dispersion introduced by the prism 16.

Therefore the invention should not be deemed to be limited to the details of what has been described herein by way of example but rather it should be demed to be limited only to the scope of the appended claims.

What is claimed is:

1. A system for displaying signals of varying intensity comprising means to produce divergent rays of light having distinctive colors, a first plane mask disposed at a location in the paths of said rays, said first mask defining a first raster of transparent lines, the transparent lines of said first raster exhibiting deflections representative of the variation in intensity of said signals, a second plane mask disposed in the paths of said rays at a location displaced from that of said first mask, said second mask defining a second raster of transparent lines, the lines of said second raster comprising undeflected transparent lines, each line of said first raster corresponding to a line of said second raster, means to maintain said first and second masks in fixed relationship whereby undeflected portions of said first raster lines and the corresponding portion of said second lines are in a uniform angular relationship with said divergent ray producing means and thereby pass only rays of a distinct color, deflections of portions of said first raster lines producing variations in said angular relationship and thereby passing different colors corresponding with the variations in signal intensity, and means to view the transmitted rays.

2. A system for displaying signals of varying intensity comprising a source of polychromatic light, means to collimate the light from said source, a prism disposed in the paths of said collimated light to produce divergent light rays having distinctive colors, a first plane mask disposed at a location in the paths of said rays, said first mask defining a first raster of transparent lines, the lines of said first raster exhibiting deflections representative of the variations in intensity of said signals, a second plane mask disposed in the paths of said rays at a location displaced from that of said first mask, said second mask defining a second raster of transparent lines, the lines of said second raster comprising undeflected lines, each line of said first raster corresponding to a line of said second raster, means to maintain said first and second masks in fixed relationship whereby undeflected portions of said first raster lines and the corresponding portion of said second lines are in a uniform angular relationship with said divergent ray producing means and thereby pass only rays of a distinct color, deflections of portions of said first raster lines producing variations in said angular relationship and thereby passing different colors corresponding with the variations in signal intensity, and means to view the light rays traversing the paths defined by said masks.

3. A system for displaying signals of varying intensity comprising a source of polychromatic light, means to collimate the light from said source, a first prism disposed in the path of said collimated light to produce divergent light rays having distinctive colors, a first plane mask disposed at a location in the paths of said rays, said first mask defining a first raster of transparent lines, the transparent lines of said first raster exhibiting deflections representative of the variation in intensity of said signals, a second plane mask disposed in the paths of said rays at a location displaced from that of said first mask, said second mask defining a second raster of transparent lines, said second raster comprising undeflected transparent lines, each line of said first raster corresponding to a line of said second raster, means to maintain said first and second masks in fixed relationship whereby undeflected portions of said first raster lines and the corresponding portion of said second lines are in a uniform angular relationship with said divergent ray producing means and thereby pass only rays of a distinct color, deflections of portions of said first raster lines producing variations in said angular relationship and thereby passing different colors corresponding with the variations in signal intensity, a second prism disposed beyond said second mask to cause the rays traversing the lines of said mask to define upon corresponding substantially straight lines, and photographic means disposed beyond said second prism to make a record of the spectral character of the light along said lines.

4. A system for displaying signals of varying intensity comprising a source of polychromatic light, means to collimate the light from said source, a first prism disposed in the paths of said collimated light to produce divergent light rays having distinctive colors, a first plane mask disposed at a location in the paths of said rays, said first mask defining a first raster of transparent lines, the lines of said first raster exhibiting deflections representative of the variations in intensity of said signals, a second plane mask disposed in the paths of said rays at a location displaced from that of said first mask, said second mask defining a second raster of transparent lines, said second raster comprising undeflected transparent lines, the number of lines in said second raster equalling a number of lines in said first raster, a second prism disposed between said masks to cause selected rays traversing the lines of said first mask to converge upon corresponding lines of said second mask, each line of said first raster corresponding to a line of said second raster, means to maintain said first and second masks in fixed relationship whereby undeflected portions of said first raster lines and the corresponding portion of said second lines are in a uniform angular relationship with said divergent ray producing means and thereby pass only rays of a distinct color, deflections of portions of said first raster lines producing variations in said angular relationship and thereby passing different colors corresponding with the variations in signal intensity, and photographic means disposed beyond said second prism to make a record of the color of the light converging upon said straight lines.

5. A system for displaying signals of varying intensity comprising a source of polychromataic light, means to collimate the light from said source, a prism disposed in the path of the collimated light to produce divergent light rays having distinctive colors, a first plane mask disposed at a location in the paths of said rays, said first mask defining a first raster of transparent lines, the transparent lines of said first raster exhibiting deflections representative of the variations in intensity of said signals, a second plane mask disposed in the paths of said rays at a location displaced from that of said first mask, said second mask defining a second raster of transparent lines, said second raster comprising undeflected transparent lines, each line of said first raster corresponding to a line of said second raster, means to maintain said first and second masks in fixed relationship whereby undeflected portions of said first raster lines and the corresponding portion of said second lines are in a uniform angular relationship with said divergent ray producing means and thereby pass only rays of a distinct color, deflections of portions of said first raster lines producing variations in said angular relationship and thereby passing different colors corresponding with the variations in signal intensity, and a lens disposed beyond said second mask, said lens being focussed upon said second mask for viewing the light rays traversing the undeflected transparent lines of said second mask.

6. A system for displaying signals of varying intensities comprising means to produce divergent rays of light having distinctive colors, a first mask disposed at a location in the paths of said rays, said first mask having a transparent line exhibiting deflections representative of the variation in intensity of said signals, a second mask disposed in the paths of said rays at a location displaced from that of said first mask, said second mask having an undeflected transparent line, means to maintain said first and second masks in fixed relationship whereby undeflected portions of said first line and the corresponding portion of said second line are in a uniform angular relationship with said divergent ray producing means and thereby pass only rays of a distinct color, deflections of said first line producing variations in said angular relationship and thereby passing different colors corresponding with the variations in signal intensity, and means to view the transmitted rays.

References Cited by the Examiner

UNITED STATES PATENTS

| | | | |
|---|---|---|---|
| 1,792,046 | 2/31 | Skaupy | 88—14 |
| 2,995,067 | 8/61 | Glenn | 88—61 |

FREDERICK M. STRADER, *Primary Examiner.*

EMIL G. ANDERSON, JEWELL H. PEDERSEN,
*Examiners.*

UNITED STATES PATENT OFFICE
CERTIFICATE OF CORRECTION

Patent No. 3,195,397          July 20, 1965

Roger H. Clapp

It is hereby certified that error appears in the above numbered patent requiring correction and that the said Letters Patent should read as corrected below.

Column 4, line 46, for "22'" read -- 22" --; same column 4, line 69, for "reflections" read -- deflections --.

Signed and sealed this 15th day of February 1966.

(AL)

est:

NEST W. SWIDER
sting Officer

EDWARD J. BRENNER
Commissioner of Patents